Jan. 31, 1956
M. J. VOGEL
2,733,351
DEVICE FOR CANDLING EGGS
Filed Dec. 13, 1952
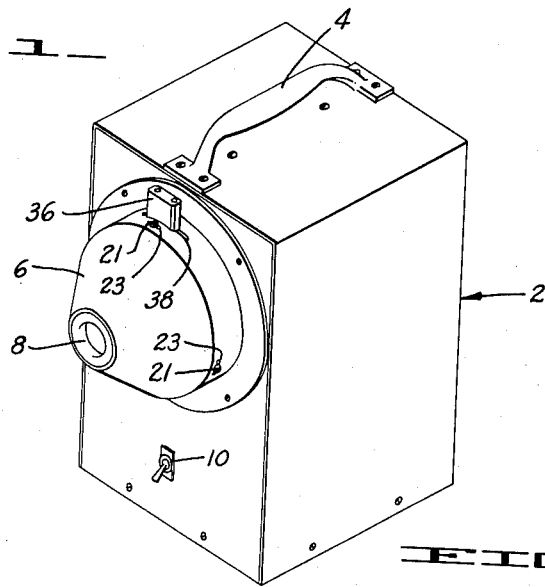
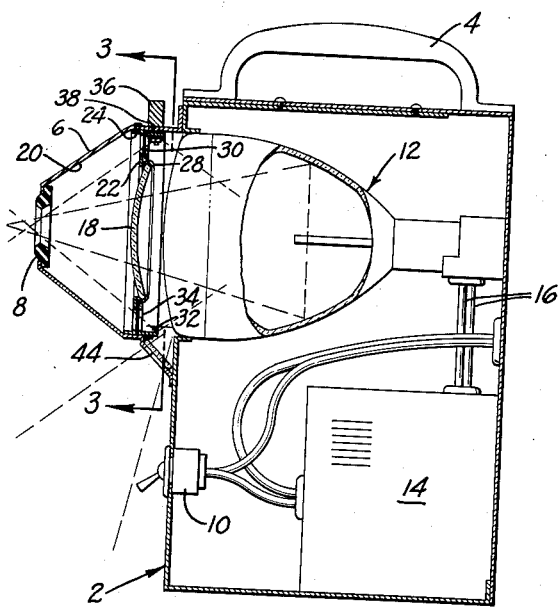
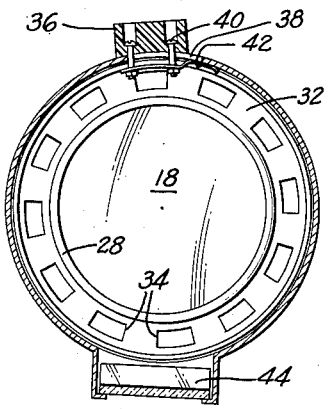
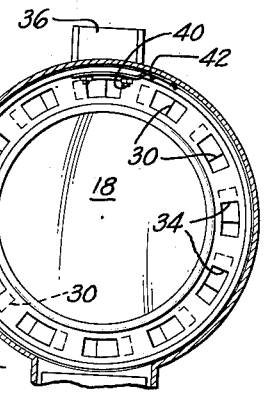
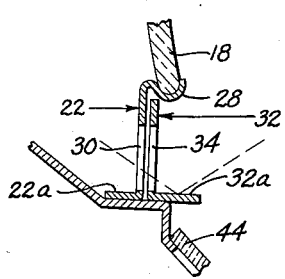
INVENTOR.
Marcel J. Vogel
ECKHOFF & SLICK, Attys.
BY
*A member of the firm*

United States Patent Office 2,733,351
Patented Jan. 31, 1956

2,733,351

DEVICE FOR CANDLING EGGS

Marcel J. Vogel, San Francisco, Calif., assignor to Vogel Luminescence Corp., a corporation of California Application December 13, 1952, Serial No. 325,786

3 Claims. (Cl. 250—51)

This invention relates to a device for candling eggs and particularly to a device wherein the eggs can be candled by simultaneous exposure to ultra-violet and visible light.

In my prior patent application, Serial No. 221,304, now Patent No. 2,686,267, of which this application is a continuation-in-part, I disclosed a device for candling eggs wherein ultra-violet and visible light were balanced in such a manner that one could candle eggs by means of visible light and at the same time detect certain defects of the eggs which are rendered visible only by ultra-violet light. The device of the present invention is the improvement over the previously described light in that it provides an easily controllable amount of visible white light and is particularly directed to an improved device wherein the color balance of the light is such that differences in the color of the shell of eggs being candled are compensated by a rapid means of light adjustment giving the operator a properly controlled degree of visibility in both brown and white eggs.

The device further provides a means of rapid calibration of the white light for maximum legibility of viewing within the interior of white eggs.

It is an object of the present invention to provide a device for candling eggs which provides a combined source of filtered ultra-violet plus visible blue light and visible yellowish white light in which the two forms of visible light are in discrete zones, and in which the visible yellowish light is diffused.

It is a further object of the present invention to provide a device for inspecting eggs by suitably filtered ultra-violet radiation which provides an intense focused beam of suitably filtered ultra-violet radiation within the egg so that the egg defects which fluoresce under filtered long wave length ultra-violet may be simultaneously seen by the operator when candling.

It is another object of my invention to provide a device for candling eggs of generally improved design.

Still another object of my invention is to provide an egg candling device in which the visible yellowish light can be rapidly increased or decreased at will by the operator to adjust for white or brown shelled eggs.

Still another object of the present invention is to provide a device for inspecting eggs having a case light thereon so that the candling device serves to illuminate the entire case of eggs with white light, enabling one to detect eggs which are dirty.

Other objects and features of advantage, together with the foregoing, will appear hereinafter wherein the present preferred form of the device of this invention is disclosed.

Reference is made to the drawings forming a part hereof, illustrating the preferred embodiment of the present invention. In the drawings:

Figure 1 is a perspective view of my improved egg candling device.

Figure 2 is a cross section of my egg candling device showing in detail the arrangement of the internal parts and also showing the path taken by visible and ultra-violet light through the device.

Figure 3 is a cross section on the lines 3—3 of Figure 2, showing in detail the shutter used to control the amount of visible yellow-white light.

Figure 4 is a view, similar to Figure 3, in which the shutter is shown in a partially closed position.

Figure 5 is an enlarged detail view showing the manner in which light is reflected around the filter.

The egg candling is housed in a box 2, which is preferably made of thin sheet metal. The box 2 is equipped with a handle 4, for convenience in carrying, a light excluding hood 6 and a circular aperture member 8. A suitable switch 10 is provided for turning the electricity on and off. Inside the housing 2 is located a suitable source of ultra-violet light 12, which is connected to a transformer 14 by means of suitable wires which have been generally designated 16. The light source 12 is a high pressure mercury vapor discharge lamp with a built-in reflector of the spot type, which emits both visible and ultra-violet light. The spotlights sold commercially by the General Electric Company and the Westinghouse Electric Company, designated H-100-SP4 or CH4 Spot, Mercury Vapor, are entirely suitable for my purpose. A light filter 18 is employed in front of the lamp 12. The filter is preferably of Pyrex heat-resisting glass with suitable proportions of nickel and cobalt salts to hold back the visible radiations and which admits a maximum passage of light therethrough at wave lengths of 3660 to 3680 Angstrom units plus a controlled amount of visible blue light in the vicinity of 4200 Angstrom units. I have found that the filter sold by the Corning Glass Company, designated No. 5876, is entirely suitable for my purpose.

The inner surface of hood 6 is provided with a mat finish 20 which serves to diffuse the yellow-white light.

The filter 18 is held in place by a ring 22, which is fastened to the hood 6 by means of self-tapping screws 21 which pass through slots 23 in the hood 6. By passing the screws through slots, one can permanently adjust the position of the ring 22 during manufacture so that a desired minimum of white light will be transmitted, as is later explained in detail. The inner surface of the ring 22 is bent over the edge of the filter, preferably by spinning, at the point 28. Thus, the filter 18 is held firmly in place within the hood 6 by means of the ring 22. The outside of the ring 22 is bent over to provide an annular flange 24.

The ring 22 has a series of apertures, designated 30, around its periphery. These apertures are preferably square or rectangular in shape, since square corners on the aperture enable the maximum passage of light when the shutter, which is hereafter described, is in the open position. Suspended by the ring 22 is a second annular ring 32, which has a series of apertures therein, 34, generally corresponding in shape and location to the apertures 30 of the ring 22. The bent over portion 28 of ring 22 serves to hold the ring 32 in position, as is shown. The ring 32 is held in place by the turned up portion 28 of the ring 22, as is shown in Figures 2 and 5.

In this position, the ring 32 is free to rotate to a limited degree, but is held in close proximity to the ring 22. The outer edge of ring 32 is bent over to provide an annular flange 32a. A handle 36 is attached to the ring 34 by means of rods 40 which protrude through a slot 38 of the cover 6. Thus, the ring 32 may be moved relative to the ring 22 so that the apertures may be brought in line to pass a maximum amount of light, or placed out of alignment so that no light passes, or placed in an intermediate position.

In Figure 4, the handle is shown turned to an intermediate position so that about half of the maximum amount of light is being passed through the shutter mechanism. Preferably, the handle 36 is provided with a friction member 42, so that the handle 36 is restrained in a desired position. The slot 38, through which the rods 40 move, is not sufficiently long to allow the shutter to completely close. Thus, the handle 36 may be moved to the smallest aperture position, and the ring 22 rotated until sufficient light passes through the shutter for candling very light eggs. The ring 22 can then be locked in position by tightening screws 21.

The lower portion of the hood 6 is equipped with a window 44, of blue sandblasted glass, which transmits a diffused white visible light.

The inner surfaces of the flanges on rings 22 and 32 are highly polished to provide reflecting surfaces. In Figures 2 and 5, there is shown the principal paths for light to take in passing through the device of the present invention. It will be noted that the ultra-violet as well as the visible blue light passing through the lens is focused at a well-defined point. Preferably, this point is about ½" within the interior of an egg being candled by the device. On the other hand, the light which passes through the shutter is of a diffused nature and is reflected from the flanges of rings 22 and 32. The drawings show the path of a ray reflected at 32a; a similar ray is reflected at 22a. The visible light forms a circle of diffused visible light just beyond the point of focus of the ultra-violet light. Thus, one has a condition where slightly beyond the aperture 8 there is an intense central point of ultra-violet light surrounded by a circle of diffused visible light.

When using a device such as that shown in my patent application Serial No. 221,304, it is sometimes difficult to secure the proper balance between the visible blue light which passes through the filter and the white light which passes around the filter. I have found that when candling eggs of different colors, it is highly desirable to use visible light of such a color that it offsets the natural pigmentation of the egg being candled. Thus, disregarding for the moment the fluorescent effect to be obtained by the ultra-violet light, it is important that the correct amounts of visible light be obtained, not only through the lens, but around the lens. In candling white eggs which have little pigmentation, about 30% of the visible light should come through the shutter and about 70% should come through the lens. When the egg candling device of the present invention is adjusted to candle white eggs, the light intensity will be from 60 to 100 foot candles when measured by a Weston Model 614 Photocell with Viscor filter. When a light-colored egg is candled with such a balance of light, the fluorescent effect is not masked, yet one is not aware of the fact that the light source is colored and it is much easier to detect any imperfections in the egg during the candling operation. The albumin in the egg appears white, while the yolk of the egg has a distint yellowish color.

Darker eggs have more yellow shell pigmentation, so that it is desirable to use more of the white light and less of the blue visible light when candling such eggs. In fact, with very dark eggs, the above ratios should be exactly reversed, so that one obtains about 70% of the visible light through the shutter and only about 30% through the lens. Of course, in each instance the amount of light coming through the lens is fixed by the optical characteristics of the device, so that one obtains these ratios by varying the amount of visible light which comes around the lens through the shutter openings.

The device of the present invention is very easy to adjust since there are no "hot spots" within the hood 6. The light coming from the visible source passes by mat surfaces where it is diffused so there is no chance to have bright spots. Further, the adjustment feature is such that an experienced operator can readily determine the correct ratio of the visible blue light to white light and set the machine.

In candlers heretofore known, the operator was frequently "blinded" by the flash of light from the candler as the operator removed an egg. The direct stream of light coming from the candler and reflected from the egg ruined the dark adaptation of the operator's eyes, slowing down the operation. In my device, this difficulty does not exist, since the light is concentrated in a zone near the aperture of the candler.

I claim:

1. A device for candling eggs consisting of a high pressure mercury vapor spot lamp which emits light in both the ultraviolet and visible bands, a light excluding hood over said spot lamp, said hood being in the form of a truncated cone having a mat finish on the inner surface of said cone, a filter interposed between said spot lamp and said cone, said filter passing predominantly ultra-violet light and a small portion of visible blue light, a series of adjustable apertures around the periphery of said filter, means for adjusting the opening of said apertures, and an annular mirror around said filter whereby light is reflected from the spot light by said annular mirror through the apertures and into the apex of the truncated cone, the small end of said truncated cone being adapted to receive an egg for candling.

2. A device for candling eggs having a source of light which emits light in both the ultra-violet and visible bands, a filter in combination therewith, said filter passing predominantly ultra-violet light and passing a minor amount of visible blue light, circular discs with reflector surfaces surrounding said filter having apertures therein, means for varying said apertures for fixing definite light output for various types of eggshell densities, and a cone-shaped hood on said filter, said cone being placed with its larger diameter against said filter, and the opposite end of said cone being adapted to receive an egg for candling.

3. A device for candling eggs comprising in combination a high pressure mercury vapor spot lamp, a round filter of smaller diameter than said lamp and located in front of said lamp, an annular reflector around the periphery of the filter and spaced therefrom, and variable aperture means for regulating the amount of light passing around the filter.

References Cited in the file of this patent

UNITED STATES PATENTS

| | | |
|---|---|---|
| 2,267,834 | Mulvany | Dec. 30, 1941 |
| 2,337,746 | Garstang | Dec. 28, 1943 |
| 2,663,232 | Drillick | Dec. 22, 1953 |